Feb. 5, 1946.  G. J. BLUM  2,394,035
SAW BLADE
Filed Nov. 3, 1943
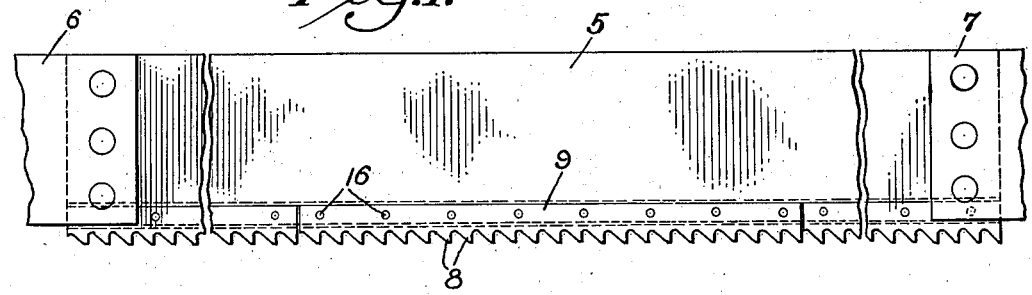
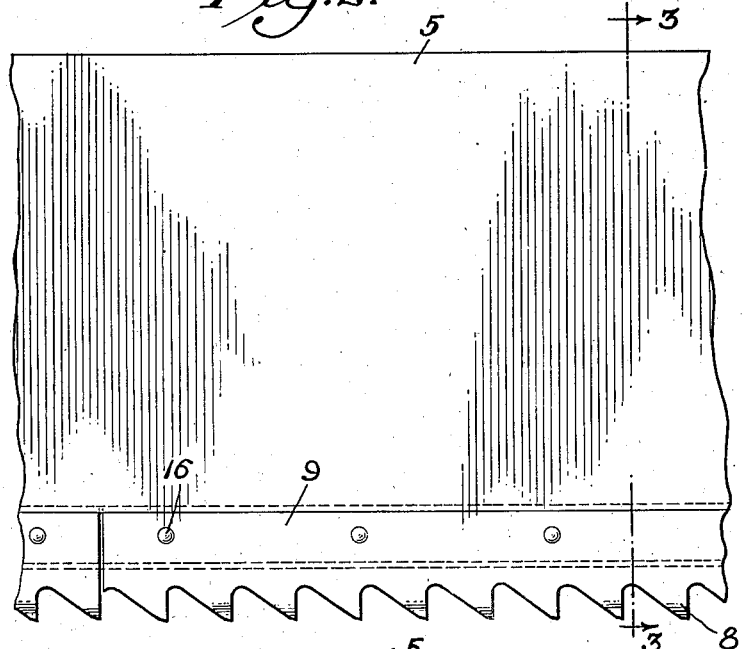
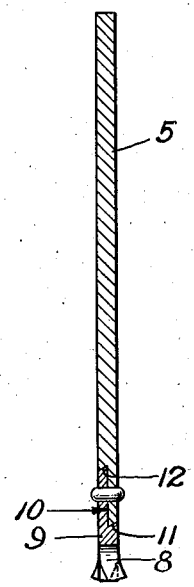
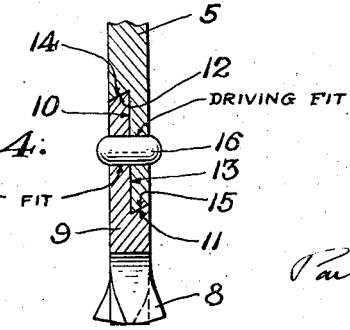
Inventor
George J. Blum
BY
Parker, Carlson, Pitzner & Hubbard.
Attorneys.

Patented Feb. 5, 1946

2,394,035

UNITED STATES PATENT OFFICE 2,394,035

SAW BLADE

George J. Blum, Chicago, Ill., assignor to Armstrong Blum Manufacturing Company, Chicago, Ill., a corporation of Illinois Application November 3, 1943, Serial No. 508,779

2 Claims. (Cl. 143—139)

The invention relates to improvements in saw blades and more particularly to saw blades of the sectional type.

One object of the invention is to provide a saw blade of the above general character having body and toothed sections of a novel and improved form which greatly facilitates the interchange of toothed sections and which provides a strong, rigid backing for the said toothed sections thereby enabling the blade to function efficiently and accurately and prolonging the useful life of the toothed sections.

A more specific object is to provide an improved mounting for the toothed sections of sectional saw blades which provides support for the sections both in the direction of their width and transversely of the blade whereby objectionable bending of the toothed sections in use is effectually prevented thus providing a strong, rugged blade assembly suitable for use in power driven saws.

Other objects and advantages will become apparent from the following detailed description of the preferred embodiment illustrated in the accompanying drawing in which:

Figure 1 is an elevational view of a saw blade embodying the features of the invention.

Fig. 2 is a fragmentary side elevational view of the blade with the elements shown on an enlarged scale.

Fig. 3 is a sectional view of the blade taken in a vertical plane substantially on the line 3—3 of Fig. 2.

Fig. 4 is an enlarged fragmentary, transverse, sectional view through the cutting edge of the blade.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, the invention has been shown herein as embodied in a saw blade of the type suitable for use in power driven hack saws. In general, the blade comprises an elongated back member or body section 5, in the form of a relatively wide strip of tough, flexible material such as steel, and having opposite ends apertured or otherwise suitably formed for mounting in the usual blade holders 6 and 7 of the hack saw. The cutting function of the blade is performed by saw teeth 8 disposed along the lower edge of the body section 5. In this instance, the teeth 8 are formed in sections 9 removably secured to the lower edge of the body section 5. The toothed sections 9 each comprise a relatively narrow strip of alloy steel or other suitable cutting material of substantially the same thickness as the body 5 and having the teeth 8 formed in one longitudinal edge. Ordinarily it is desirable to make the toothed sections relatively short and of like dimensions to facilitate manufacture and to reduce the expense of replacement when one or a relatively few teeth become damaged.

In carrying out the invention I construct the body section 5 and each toothed section 9 with longitudinal edge portions of reduced thickness shaped to interlock and form a continuous joint adapted to provide rigid support for the toothed sections both in the direction of their width and laterally of the saw blade so as to prevent the movement of one section laterally with respect to the other section. For this purpose one face of the body section 5 is milled or otherwise cut away adjacent its lower edge to provide a longitudinal recess or rabbet 10. The lower edge of the body section is beveled as at 11 and the shoulder formed by the rabbet 10 is undercut to form a groove 12.

The opposed face portion of the blade section 9 is similarly rabbeted as at 13 and the upper edge is beveled as at 14 to interfit in the undercut groove 12 of the body section. Moreover the shoulder defined by the rabbet 13 is undercut to form a groove 15 adapted to receive the beveled edge 11 of the body section. The grooves and bevels are cut to fit accurately and when pressed together provide a doubly locked joint effective to resist lateral displacement of the toothed section 9 in either direction with respect to the body section 5. Thus, when pressure is applied edgewise of the toothed section, as when the blade is in use, the interlocking surfaces are forced into tighter engagement, thereby substantially increasing the ability of the joint to resist relative lateral deflection of the parts. It has been found that particularly satisfactory results may be obtained by beveling the interengaging surfaces of the elements on an angle of approximately 35°.

Means is provided for holding the toothed sections 9 in assembled relation with the body section 5 and for preventing relative endwise movements of the toothed section and the body section. This means, in its preferred form, comprises a plurality of cylindrical dowel pins 16 adapted to project through alined holes in the interfitting rabbeted portions of the respective sections. Preferably the dowel pins and holes are dimensioned so that the pins have a driving fit in the body holes and a snug fit in the holes of the toothed section. The projecting ends of the dowel pins may be rounded to prevent them from catching on the work. When replacement of the toothed section is necessitated by the wear or breaking of one or more of the saw teeth formed therein, the section may be quickly and easily detached by simply driving out the dowel pins 16.

In operation, the blade assembly is drawn in a forward direction (to the right as shown in Figs. 1 and 2) with the teeth 8 in contact with the work. The pressure on the teeth accordingly forces the beveled edges of the blade sections firmly into the grooves of the companion parts, thus locking the sections rigidly together. Lateral strains on the blade section are thus transmitted to the body section through the joint instead of through the dowel pins and the strains are uniformly distributed along the entire length of the toothed section due to the continuous character of the joint. Lateral movement of the toothed section relative to the body section is thus effectually prevented thereby reducing breakage of the toothed sections and enabling them to function accurately and with a high degree of efficiency. Moreover, the toothed sections may be interchanged quickly and easily without the use of special tools.

It will be apparent from the foregoing that the invention provides a sectional saw blade of novel and improved construction. The blade and body sections are formed in a novel manner so as to interlock in a manner effective to provide rigid backing for the toothed sections both in the direction of their width and laterally of the blade. Relative lateral movements of the blade elements are thus effectually prevented thereby enabling the blade to cut accurately and materially increasing the useful life of the toothed sections. In general, the improved construction provides a sectional saw blade of simple yet rugged construction suitable for use in power driven saws.

I claim as my invention:

1. A saw blade having, in combination, an elongated blade body in the form of a relatively wide thin strip of tough flexible steel, a plurality of toothed sections each comprising a long narrow strip of alloy steel of substantially the same thickness as said body and each section having saw teeth formed along one longitudinal edge thereof, the opposite longitudinal edges of the respective toothed sections and one edge of said blade body being longitudinally rabbeted to permit assembly of the same in substantially coplanar, overlapping, interfitting relation, the rabbeted edges of the blade body and said sections each being beveled and the shoulders defined by the rabbets being correspondingly undercut to receive the beveled edges and thereby provide a continuous interlock between the blade body and the blade sections effective to prevent relative lateral movement thereof out of the plane of the interlocked parts, and other means operative to prevent relative endwise and transverse movements of the interlocked parts within the plane thereof.

2. A saw blade as described in claim 1 wherein said last mentioned means is a dowel pin snugly fitted into aligned apertures provided in the respective toothed sections and said elongated blade body and extending transversely of the plane of said interlocked parts.

GEORGE J. BLUM.